(12) United States Patent
Leijon et al.

(10) Patent No.: US 8,051,625 B2
(45) Date of Patent: Nov. 8, 2011

(54) WIND-POWER UNIT, A SUPPORTING PILLAR THEREFORE AND A USE THEREOF

(75) Inventors: Mats Leijon, Uppsala (SE); Hans Bernhoff, Uppsala (SE)

(73) Assignee: Vertical Wind AB, Uppsala (SE)

( * ) Notice: Subject to any disclaimer, the term of this patent is extended or adjusted under 35 U.S.C. 154(b) by 0 days.

(21) Appl. No.: 12/451,817

(22) PCT Filed: Jun. 10, 2008

(86) PCT No.: PCT/SE2008/050690
§ 371 (c)(1),
(2), (4) Date: Dec. 2, 2009

(87) PCT Pub. No.: WO2008/153489
PCT Pub. Date: Dec. 18, 2008

(65) Prior Publication Data
US 2010/0170164 A1    Jul. 8, 2010

(30) Foreign Application Priority Data
Jun. 11, 2007  (SE) ...................................... 0701404

(51) Int. Cl.
*E04C 3/00* (2006.01)
(52) U.S. Cl. ............ 52/847; 52/848; 52/745.04; 290/44; 290/55
(58) Field of Classification Search ............ 52/831, 52/834, 847, 848, 745.04; 290/40, 55, 44
See application file for complete search history.

(56) References Cited

U.S. PATENT DOCUMENTS

| | | | | |
|---|---|---|---|---|
| 4,357,057 A * | 11/1982 | Peterson et al. | ............... | 384/125 |
| 4,435,646 A * | 3/1984 | Coleman et al. | ................ | 290/44 |
| 4,565,929 A * | 1/1986 | Baskin et al. | .................... | 290/44 |
| 4,615,154 A * | 10/1986 | Troutner | .......................... | 52/40 |
| 5,050,366 A * | 9/1991 | Gardner et al. | ................. | 52/847 |
| 5,704,187 A * | 1/1998 | Hosford et al. | ................. | 52/848 |
| 6,105,321 A * | 8/2000 | KarisAllen et al. | .......... | 52/223.8 |
| 6,320,273 B1 | 11/2001 | Nemec | | |
| 6,676,122 B1 * | 1/2004 | Wobben | .......................... | 290/55 |

(Continued)

FOREIGN PATENT DOCUMENTS

DE         20314750         1/2004

(Continued)

OTHER PUBLICATIONS

English Abstract of DE20314750.
English Abstract of JP 2003176774.
English Abstract of EP 0686733.

*Primary Examiner* — Brian Glessner
*Assistant Examiner* — Chi Nguyen
(74) *Attorney, Agent, or Firm* — Dykema Gossett PLLC

(57) ABSTRACT

The invention relates to a wind-power unit having a turbine having a vertical turbine shaft (3), an electrical generator (6) connected to the turbine and a vertical hollow supporting pillar (2) supporting the turbine. According to the invention the material of the supporting pillar is in all essentials wood. The invention also relates to a supporting pillar for such a wind-power unit, an electric mains connected to the wind-power unit, a use of the wind-power unit and a method for the manufacture of such a supporting pillar.

11 Claims, 2 Drawing Sheets

U.S. PATENT DOCUMENTS

| | | | |
|---|---|---|---|
| 6,902,370 B2 * | 6/2005 | Dawson et al. | 415/4.1 |
| 7,161,260 B2 * | 1/2007 | Kruger-Gotzmann et al. | 290/55 |
| 7,220,104 B2 | 5/2007 | Zheng et al. | |
| 7,276,808 B2 * | 10/2007 | Weitkamp et al. | 290/55 |
| 7,322,798 B2 * | 1/2008 | Cairo | 416/229 R |
| 7,345,375 B2 * | 3/2008 | Joo | 290/55 |

FOREIGN PATENT DOCUMENTS

| | | |
|---|---|---|
| EP | 0686733 | 12/1995 |
| JP | 2003176774 | 6/2003 |
| WO | 2005028781 | 3/2005 |

* cited by examiner

WIND-POWER UNIT, A SUPPORTING PILLAR THEREFORE AND A USE THEREOF

FIELD OF THE INVENTION

In a first aspect, the present invention relates to a wind-power unit comprising a turbine having a vertical turbine shaft, an electrical generator connected to the turbine, and a vertical hollow supporting pillar supporting the turbine.

In a second aspect, the invention relates to a supporting pillar for a wind-power unit.

In a third aspect, the invention relates to an electric mains, in a fourth aspect to a use of the invented wind-power unit and in a fifth aspect to a method for the manufacture of a supporting pillar.

BACKGROUND OF THE INVENTION

Recovery of wind energy has been known for thousands of years. To utilize wind power for generation of electric current is also known since long, in principle all the way since the electrical generator saw the light of day.

The wind power has however had difficulties to successfully compete economically with other energy sources for electrical energy production. The utilization of the wind power for this has for long been limited to local energy supply and test plants. Even if commercial production of wind power-based electrical energy to the mains has developed considerably during the last decades the share thereof of the total electrical energy production is still very marginal.

In view of the great quantity of energy that potentially is available in the wind power and in view of different disadvantages associated with electrical energy production from other types of energy sources, it is important to create opportunities for an increased quantity of commercially competitive production of electrical energy based on wind power.

The predominant technique in generation of electrical energy from wind-power units has been based on units where the wind turbine has a horizontal shaft. Different types of wind turbines having vertical shaft have also been pro-posed. Among these, the so-called H-rotor may be mentioned. See e.g., U.S. Pat. No. 6,320,273 and WO 031058059.

In order to achieve that a wind-power unit should be able to generate electrical energy to competitive prices, it is important to optimize each component in such a one from technical and economic point of view.

The present invention has as object to provide such an optimization as regards the supporting pillar carrying the turbine of the wind power unit.

SUMMARY OF THE INVENTION

The object set forth is attained in the first aspect of the invention by the fact that a wind-power unit of the kind indicated by way of introduction has the special feature that the material of the supporting pillar in all essentials is wood, that the supporting pillar comprises laminated beams, the principal direction components of which are vertical and the supporting pillar comprising fibre material such as, for instance, glass fibre, carbon fibre and natural fibre.

By abandoning the conventional material, i.e., steel for such a supporting pillar, a much higher supporting capacity is attained at the same cost, alternatively the same supporting capacity at a much lower cost in comparison with conventional design. The more inexpensive construction material makes it in addition possible to form the supporting pillar with a more suitable design for the purpose than otherwise.

The use of wood as construction material in this connection entails in addition advantages from environmental point of view.

Having in all essentials vertically directed wooden beams, the strength properties of the wood are utilized in the best way, and a stable construction is easy to provide. Laminated beams are in that connection preferable since these have more stable shape and are generally seen more suitable for building constructions.

Fibre material is by virtue of the strength properties thereof an advantageous material to be included as a component in a composite construction. This among other things by virtue of the well-defined direction orientation thereof, which is valuable in strength-wise especially exposed parts of the support pillar and by virtue of the uniting co-operation thereof with the wooden beams of the support pillar so that the properties thereof to support load and bending loads are strengthened.

According to a preferred embodiment of the invented wind-power unit, the supporting pillar has a lower and an upper end, the cross-sectional area of the supporting pillar in a horizontal plane varying depending on the distance from the lower end so that the mean value for the cross-sectional area of the lower half of the supporting pillar is greater than the mean value for the cross-sectional area of the upper half of the supporting pillar, preferably at least twice as great. With cross-sectional area, reference is also made to the area that is covered by the hollowness of the supporting pillar, i.e., the entire area that is circumscribed by the outer limitation border of the supporting pillar. The mean values are defined by the fact that a number of horizontal sections are cut through the support pillar, so that the lower and upper half, respectively, vertically are divided by the horizontal sections into the same number of equally long parts. For each half, a mean value is obtained for the cross-sectional area of the horizontal sections, which mean values accordingly are compared.

By in this way forming the supporting pillar generally wider at the bottom, it becomes more stable than if the cross-sectional area would be in all essentials constant. It entails increased reliability and lower requirements of other measures in order to get a stable anchorage. For instance, the need of support ropes can be eliminated.

It is in that connection especially preferred that the supporting pillar next to the lower end thereof has a cross-sectional area that is several times as large as the cross-sectional area of the supporting pillar next to the upper end thereof, preferably 5 to 15 times as great.

Thereby, the design of the supporting pillar as an upward tapering construction is additionally accentuated, and the stability aspect consequently even more marked. In that connection, the indicated interval of the area relation should constitute an optimally adjusted balance between to on one hand, achieve high stability and, on the other hand, limit consumption of material and requisite surface of the foundation on which the supporting pillar rests. The optimal area relation is in part depending on the height of the supporting pillar, and becomes greater the higher the same is.

According to an additional preferred embodiment the supporting pillar has a continuously decreasing cross-sectional area from below and up along at least the greater part of the height thereof, the continuously decrease of the cross-sectional area preferably being uniform. Such a shape of the supporting pillar entails a harmonic carrying of bending and compression strains where dimensioning narrowly can be adapted to what is required in the respective vertical position of the supporting pillar. In that connection, the material consumption can be kept low. If the decrease of the cross-sectional area is uniform along the entire extension in question, this effect is strengthened and the advantages it entails. It is of course ideal in this aspect to form the tapering upward of the supporting pillar along the entire extension thereof. However, other considerations may entail that a part of the supporting pillar is shaped in another way.

According to an additional preferred embodiment, said part of the supporting pillar has the shape of a truncated cone.

In that connection, the same becomes entirely symmetrical around the rotation axis of the turbine and distribution of occurring stresses are distributed as evenly as possible.

According to an additional preferred embodiment, the supporting pillar is of composite material.

By in addition to wood as principal building material also use other materials, the latter may supplement the properties of the wood regarding certain functions where other materials are better suitable. Thereby, an additionally improved construction is attained regarding the total requirements that the supporting pillar should meet.

According to an additional preferred embodiment, at least some of the wooden beams have a direction component running also in the circumferential direction of the supporting pillar.

Thereby, the strength properties of the supporting pillar are improved for certain types of load cases.

According to an additional preferred embodiment, the supporting pillar is in that connection built up by at least two layers of wooden beams, where the wooden beams of one layer have a direction component in the circumferential direction of the supporting pillar that is counter-directed to the direction component in the circumferential direction of the supporting pillar of the wooden beams in the closest adjacent layer at the corresponding circumference position.

From a strength point of view, it may be an additional advantage to form the supporting pillar in two or more layers, especially in great constructions. The counter-directed orientation of the wooden beams in the different layers entails an additional stabilization, by the fact that the maximal load take-up direction for the respective layers supplement each other. The layers are suitably interconnected, in addition a reciprocal support action being attained between the counter-directed layers.

According to an additional preferred embodiment, the supporting pillar is composed of a plurality of vertically distributed sections.

In those cases the supporting pillar is prefabricated and accordingly is transported to the site of erection, such a sectioning entails that the transportation is facilitated, especially when great wind-power units are concerned.

According to an additional preferred embodiment, the wind-power unit comprises a container arranged in the vicinity of the upper end of the supporting pillar arranged to be able to contain a variable quantity of material.

By filling the container with a suitably balanced quantity of material, the natural vibration of the supporting pillar is influenced. The amount of material may in that connection be calibrated so that the natural vibration is far from the resonances that may become present for the operation conditions that can be fore-seen, and that otherwise would risk operational disturbances. By the fact that the mass in the container easily can be varied, this can in an easy way be provided by checking with actually occurring vibrations, which gives greater reliability than if the mass was dimensioned based on uncertain and complicated calculations.

According to an additional preferred embodiment, the container is arranged to be able to contain a granular material, for instance gravel. By using a granular material such as gravel or the like, it is very easy to vary the amount of material.

According to an additional preferred embodiment, the supporting pillar has a height of at least 30 m.

The advantages of forming the supporting pillar in all essentials of wood become significant above all for relatively great units, and therefore this embodiment is of special interest.

According to an additional preferred embodiment, the supporting pillar is supported by stays, e.g., bars, wires or synthetic ropes.

Although a wind-power unit according to the invention enables to eliminate such a support, it may in certain cases be expedient with supporting in this way and thereby additionally increase the stability.

According to a preferred embodiment, the number of stays is in that connection at least three.

The more stays, the better the support will be and by means of three stays, a good support is attained in all cross-directions.

The above-mentioned preferred embodiments of the invented wind-power unit is defined in the claims depending on claim 1.

In the second aspect of the invention, the object set forth has been attained by a supporting pillar for a wind-power unit with vertical shaft being formed in the way that is defined for the supporting pillar of the wind-power unit according to the present invention or some one of the preferred embodiments of the same.

In that connection, the corresponding advantages are gained as have been given above for the invented wind-power unit.

In the third and fourth aspects of the invention, the advantages are utilized of a wind-power unit according to the invention by the electrical mains being connected to a wind-power unit according to the invention and by the invented wind-power unit being used for generation of electrical energy, respectively.

In the fifth aspect of the invention, the object set forth is attained by the fact that the method mentioned by way of introduction comprises the special measure that the supporting pillar of the wind-power unit in all essentials is built of wood and at least partly of laminated beams, the principal direction component of which is vertical and that furthermore fibre material such as, for instance, glass fibre, carbon fibre or natural fibre is used as building material.

According to a preferred embodiment, the supporting pillar is manufactured in a plurality of sections intended to upon erection of a wind-power unit be arranged above each other.

According to additional preferred embodiments of the invented method, the supporting pillar is manufactured so that it is imparted the features defined for the supporting pillar in the wind-power unit according to any one of the preferred embodiments of the same.

By the invented method, advantages are gained of the corresponding type gained with the invented wind-power unit and the preferred embodiments of the same and that have been accounted for above.

The invention is described in more detail by the subsequent detailed description of advantageous embodiment examples of the invention, reference being made to the accompanying figures.

DESCRIPTION OF ADVANTAGEOUS EMBODIMENT EXAMPLES

Figure 1:
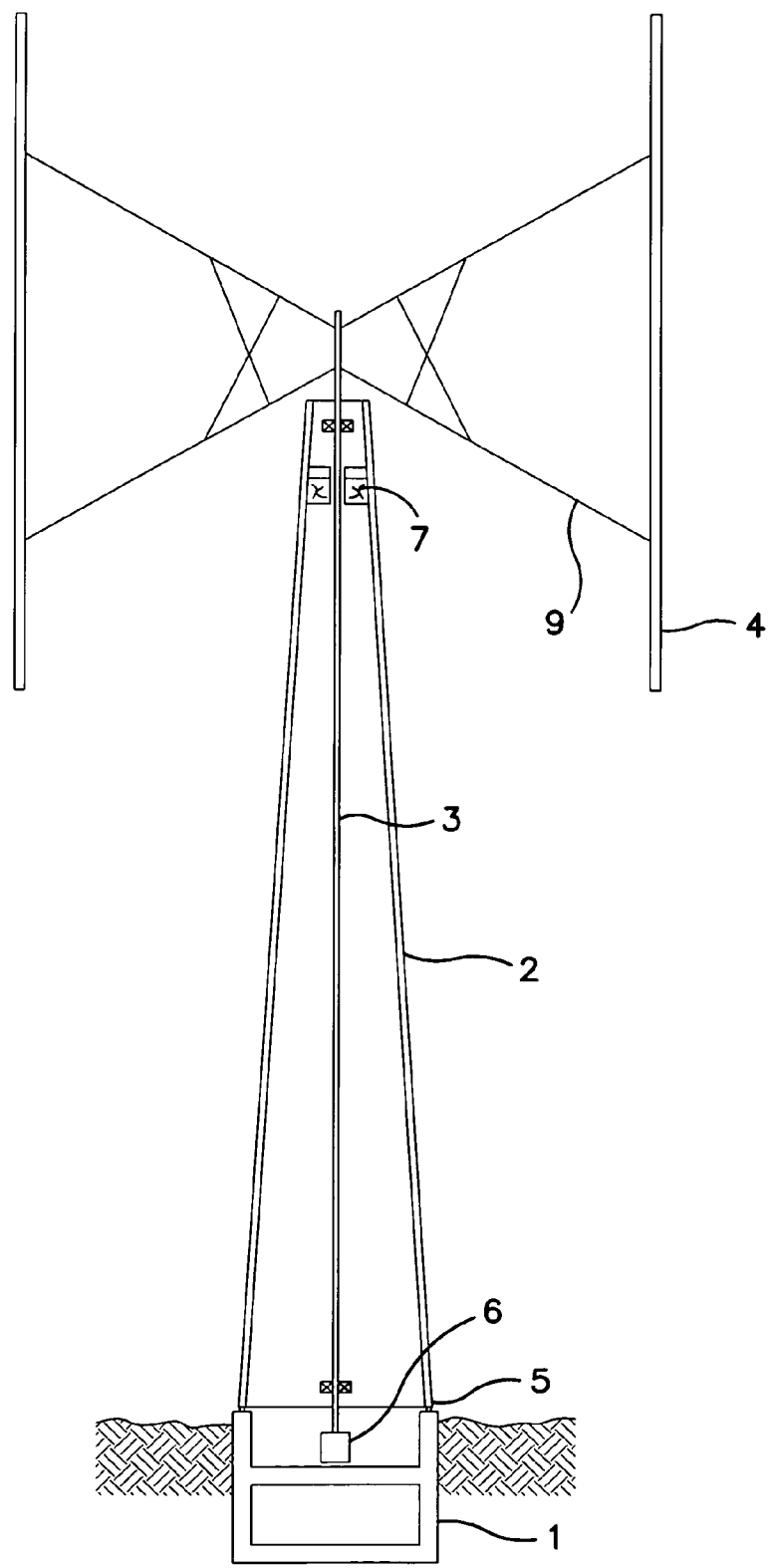
FIG. 1 is a schematic vertical section through a wind-power unit according to the invention.

In FIG. 1, a wind-power unit according to the invention is illustrated having a wind turbine, a foundation 1, a supporting pillar 2 resting on the foundation 1 and is anchored at the same by means of anchorage devices 5. Furthermore, a generator 6 is comprised.

The wind turbine has a vertical shaft 3 and a rotor having vertical turbine blades 4. Each turbine blade 4 is connected with the shaft 3 by wooden supporting arms 9. A container 7 is mounted inside the supporting pillar 2 near the upper end thereof.

The supporting pillar 2 is built of laminated beams. It has a conical shape. For a wind-power unit of 200 kW, the height of the supporting pillar 2 is approx. 40 m. The diameter thereof at the lower end is approx. 2.5 m and at the upper end approx. 1 m. For a wind-power unit of 1 MW, the corresponding measures are in the order of 100 m, 6 m and 2 m, respectively.

The supporting pillar 2 may alternatively be made with another shape than purely conical. It may, e.g., be shaped so that the inclination of the wall describes a slightly concave or convex line, in comparison with the straight line of the cone. It may be shaped as a number of cylindrical sections, where the sections have smaller diameter the higher up they are situated. Also a conical construction may correspondingly be shaped with steps in the diameter change. Conical and cylindrical sections may be combined, etc. The cross-section of the supporting pillar may have another shape than a circle, e.g., a polygon.

The container 7 is fastened at the supporting pillar and is intended to be possible to be moved with suitably balanced quantity of gravel to be adjusted against the natural vibrations of the supporting pillar 2.

Figure 2:
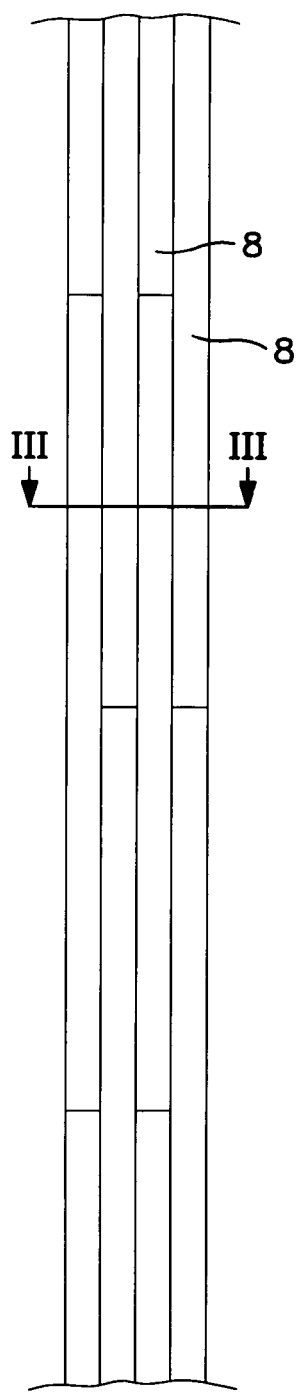
FIG. 2 is a part side view of the wind-power unit according to FIG. 1.

FIG. 2 is a part of a side view of the supporting pillar and illustrates how the same is constructed from laminated beams 8. The laminated beams are shown having uniform thickness and shape and with the same dimension along the entire extension thereof. In view of the conicity, it may be expedient to make at least a part of the beams somewhat tapering upward. Beams of different length and shape may of course be used.

Figure 3:
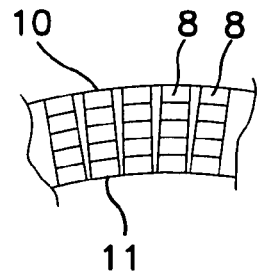
FIG. 3 is a section along the line III-III in FIG. 2.

In FIG. 3, which is a section along the line III-III in FIG. 2, it is seen how the laminated beams 8 are arranged side by side. They are suitably glued against each other. If the beams have a rectangular cross-section, there will be a wedge-shaped slit between the beams. Thus, the glue layer will be thicker at the outer periphery. Alternatively, wedge-shaped filling may fit into these slits. Another possibility is to form the beams having a slightly trapezoid cross-section.

The wall of the supporting pillar 8 is on the outside thereof coated with a protecting covering 10. The covering is suitably a composite material of the type glass epoxy and which comprises e.g., glass fibre, carbon fibre or natural fibre. A corresponding covering 11 exists on the inside of the wall. In FIG. 2, the covering 10 is omitted for the sake of clarity.

Figure 4:
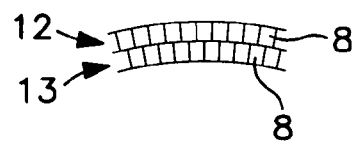
FIG. 4 is a section corresponding to the one in FIG. 3 but illustrating an alternative embodiment example.

FIG. 4 shows in a section corresponding to the one in FIG. 3 an embodiment example where the wall of the supporting pillar 8 is composed of an outer 12 and an inner 13 layer. Each layer is constructed from laminated beams 8 in a similar way as the one in FIG. 3. The two layers are glued against each other.

Figure 5:
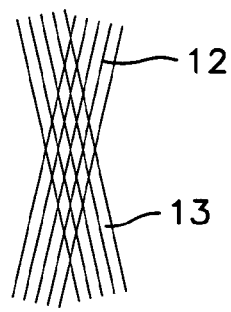
FIG. 5 is an explanatory sketch illustrating an aspect of the embodiment example according to FIG. 4.

FIG. 5 illustrates the direction of the laminated beams when the wall of the supporting pillar 8 is constructed in two layers such as in FIG. 4. The beams 8 are tilted laterally in the vertical plane and directed toward opposite direction in the two layers so that they intersect each other.

Figure 6:
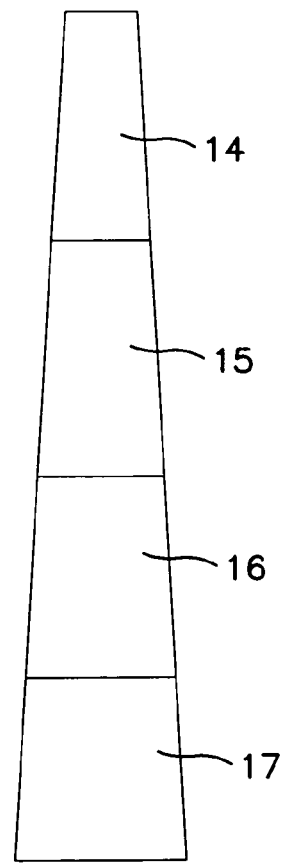
FIG. 6 is a side view of a supporting pillar according to an additional alternative embodiment example.

FIG. 6 illustrates a supporting pillar, which is composed of four different sections 14-17 arranged above each other. The supporting pillar is delivered to the building site in sections and is there joined using suitable joint.

Figure 7:
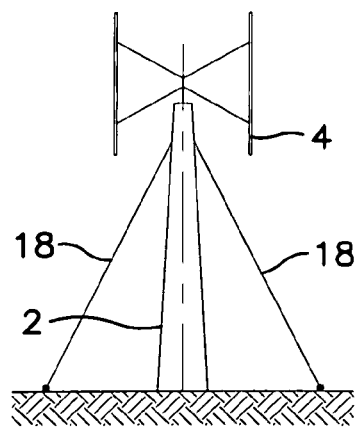
FIG. 7 is a side view of a wind-power unit according to an additional embodiment example.

FIG. 7 illustrates how the supporting pillar 2 may be supported by a number of stays 18.

The invention claimed is:

1. A wind-power apparatus which comprises
    a hollow supporting pillar which, when vertically oriented, defines an upper end and a lower end and has a continuously decreasing horizontal cross-sectional area upwardly along a greater part of a height thereof, a first cross-sectional area at the lower end being several times larger than a cross-sectional area at the upper end and a first mean value of the cross-sectional area of a lower half thereof being greater than a second mean value of an upper half thereof, said hollow supporting pillar comprising a surrounding wooden side wall having a protective coating over an exterior surface thereof, said wooden side wall comprising a plurality of upwardly-extending elongated laminated wooden beams, each of said plurality of wooden beams having a trapezoidal cross-section and a portion which tapers in an upward direction, and said protective coating comprising a fibrous composite material,
    a turbine located at the upper end of said supporting pillar for rotation by wind,
    an electrical generator vertically located beneath the upper end of said supporting pillar, and
    a rotatable shaft which extends vertically from said turbine downwardly to said electrical generator.

2. The wind-power apparatus according to claim 1, wherein the supporting pillar along at least the greater part of the height thereof is in the shape of a truncated cone.

3. The wind-power apparatus according to claim 1, wherein at least some of the wooden beams have a direction component running in the circumferential direction of the supporting pillar.

4. The wind-power apparatus according to claim 3, wherein the supporting pillar is constructed from at least two layers of wooden beams, where the wooden beams of one layer have a direction component in the circumferential direction of the supporting pillar that is counter-directed to the direction component in the circumferential direction of the supporting pillar of the wooden beams in the closest adjacent layer at the corresponding circumference position.

5. The wind-power apparatus according to claim 1, wherein the supporting pillar is composed of a plurality of vertically distributed sections.

6. The wind-power apparatus according to claim 1, comprising a container arranged in the vicinity of the upper end of the support pillar arranged for containing a variable quantity of material.

7. The wind-power apparatus according to claim 6, wherein the container is arranged to be able to contain granular material.

8. The wind-power apparatus according to claim 1, wherein the supporting pillar has a height of at least 30 m.

9. The wind-power apparatus according to claim 1, wherein the supporting pillar is supported by stays.

10. The wind-power apparatus according to claim 9, comprising at least three stays.

11. A supporting pillar for a wind-power unit with vertical shaft for generation of electrical energy which is hollow and made of wood and fiber material and includes laminated beams; comprising a hollow supporting pillar which, when vertically oriented, defines an upper end and a lower end and has a continuously decreasing horizontal cross-sectional area upwardly along a greater part of a height thereof, a first cross-sectional area at the lower end being several times larger than a cross-sectional area at the upper end and a first mean value of the cross-sectional area of a lower half thereof being greater than a second mean value of an upper half thereof, said hollow supporting pillar comprising a surrounding wooden side wall having a protective coating over an exterior surface thereof, said wooden side wall comprising a plurality of upwardly-extending elongated laminated wooden beams, each of said plurality of wooden beams having a trapezoidal cross-section and a portion which tapers in an upward direction, and said protective coating comprising a fibrous composite material.

\* \* \* \* \*